3,524,895
METHOD FOR SEPARATING TRANS FROM CIS ISOMERS
Nai Yuen Chen, Cherry Hill, and Stanley J. Lucki, Runnemede, N.J., assignors to Mobil Oil Corporation, a corporation of New York
No Drawing. Continuation of application Ser. No. 624,100, Mar. 17, 1967. This application June 19, 1969, Ser. No. 838,023
Int. Cl. C07c *11/00, 7/12*
U.S. Cl. 260—677    3 Claims

ABSTRACT OF THE DISCLOSURE

An improved separation of cis and trans hydrocarbon isomers is achieved by passing a mixture thereof through a crystalline aluminosilicate adsorption zone for a relatively short adsorption period. It has been found that the rate of adsorption of the cis isomer is substantially lower than the trans isomer and that trans isomers can be separated from mixtures thereof with cis isomers if the period of time allowed for adsorption is such that adsorption of the cis isomer by the aluminosilicate does not exceed 50 percent of the sorption capacity of the aluminosilicate.

CROSS REFERENCE TO RELATED APPLICATIONS

This application is a continuation of Ser. No. 624,100, filed Mar. 17, 1967, which is a continuation-in-part of application Ser. No. 340,789, filed Jan. 28, 1964, and both now abandoned.

BACKGROUND OF INVENTION

Field of the invention

The art to which the invention pertains relates to the separation of trans hydrocarbon isomers from a mixture thereof with cis hydrocarbon isomers by means of adsorption with crystalline aluminosilicates using relatively short periods of time for adsorption. The invention is particularly applicable to separation of trans olefins and diolefins from mixtures thereof with cis olefins and diolefins.

Description of the prior art

U.S. Pat. 2,850,549, issued Sept. 2, 1958, discloses the separation of cis and trans olefin isomers wherein the separation is carried out over a long period of time, e.g. 24 hours.

U.S. Pat. 2,866,835, issued Dec. 30, 1958, is cumulative to U.S. 2,850,549 in showing that cis and trans isomers can be separated by means of a crystalline aluminosilicate.

Compared to the prior art, the present invention provides an improved method for obtaining higher yields of trans isomers from mixtures thereof with cis isomers.

SUMMARY OF INVENTION

The present invention provides an improved method for separating trans isomers from mixtures thereof with cis isomers. The separation is achieved due to the difference in rate of diffusion of the isomers into the sorption area of the aluminosilicate. When the time allowed for adsorption is relatively short, the trans isomer diffuses more rapidly and greater concentrates or enrichments thereof can be obtained. At equilibrium, the cis isomers is more strongly adsorbed and lesser concentrates of the trans isomer are obtained. To obtain high concentrates of the trans isomer, the adsorption is carried out for a period of time such that adsorption of the cis isomer does not exceed 50 percent of the sorption capacity of the aluminosilicate.

DESCRIPTION OF THE PREFERRED EMBODIMENT

The present invention generally relates to the separation of hydrocarbon isomers. More specifically, the invention is directed to the separation of trans olefins and cis olefin isomers.

The geometric isomers of olefins of 4, 5, 6 or 7 carbon atoms, e.g., butene, trans-butene-2 and cis-butene-2, exhibit different physical and chemical properties which make it highly desirable that methods be available for separating them from their mixtures. For example, it has been found that a higher copolymerization rate is realized between ethylne and cis-butene-2 than with trans-butene-2 and that ethylene and cis-butene-2 alternating copolymers are crystalline while the ethylene and trans-butene-2 alternating copolymers are amorphous. Accordingly it is important to be able to separate the isomers of various hydrocarbons.

In general, the present invention comprises separating trans olefins from cis olefins by passing a mixture thereof over a crystalline aluminosilicate adsorbent. The crystalline aluminosilicates have been found to preferentially adsorb reliable volumes of trans and cis isomers so that the adsorption of the trans isomer is favored. As an example, calcium zeolite A, no matter how long exposed, will only take up about 20 ml. of trans-butene-2 per 100 grams of adsorbent, but will take up most of this in the first ten minutes of exposure, whereas it takes in cis-butene-2 more slowly.

It has been discovered also that the relative rate of adsorption of trans olefins as compared with the rate of adsorption of cis olefins can be greatly enhanced by causing up to 10% and preferably about 5% by weight of water or ammonia to be adsorbed in the crystalline aluminosilicate prior to contact with the mixture of isomers.

The crystalline aluminosilicates used for purposes of the invention are known materials and may be described as a three-dimensional framework of $SiO_4$ and $AlO_4$ tetrahedra in which the tetrahedra are cross linked by the sharing of oxygen atoms whereby the ratio of total aluminum and silicon atoms to oxygen atoms is 1:2. In their hydrated form, the aluminosilicates may be represented by the formula:

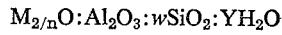

$$M_{2/n}O:Al_2O_3:wSiO_2:YH_2O$$

wherein M represents at least one cation which balances the electrovalence of the tetrahedra, $n$ represents the valence of the cation, $w$ the moles of $SiO_2$ and Y the moles of $H_2O$. The cation can be any or more of a number of metal ions, depending upon whether the aluminosilicate is synthesized or occurs naturally.

Typical cations include sodium, lithium, hydrogen, potassium, silver, magnesium, calcium, zinc, barium, iron, nickel, cobalt and manganese. Although the proportions of inorganic oxides in the silicates and their spatial arrangements may vary affecting distinct properties in the aluminosilicate, the main characteristic of these materials is their ability to undergo dehydration without substantially affecting the $SiO_4$ and $AlO_4$ framework.

Among the aluminosilicates which can be employed are synthesized aluminosilicates such as zeolites A and T and natural aluminosilicates such as chabazite, gmelinite, levynite, erionite, offretite, and the like. These aluminosilicates contain an eight-membered ring structure and have a pore size of less than about 5 angstrom units.

Examples of hydrocarbons which are separated from one another according to the invention are molecules which contain 4, 5, 6 or 7 carbon atoms per molecule. The invention is particularly applicable to the separation of cis and trans olefins and diolefins such as trans-butene-2 and cis-butene-2, trans-pentene-2 and cis-pentene-2, trans-hexene-2 and cis-hexene-2, trans-hexene-3 and cis-hexene-3, trans-heptene-3 and cis-heptene-3, as well as diolefins such as mixtures of trans and cis-1,3 pentadiene.

In general, the separation of cis and trans olefins is accomplished by passing a mixture of the isomers through a body or packed bed of the aluminosilicate adsorbent at any temperature at which the mixture can be vaporized without decomposition. The olefin feed may consist of the isomers or an admixture of the same with an inert entraining agent such as nitrogen or helium.

The time period for adsorption is important since it has been found that at short contact times the trans isomers diffuse more rapidly and greater concentrates or enrichments thereof can be obtained. The cis and trans isomers of olefins having 4, 5, 6 or 7 carbon atoms per molecule are adsorbed by the above-noted aluminosilicates to an extent of less than about 20% by weight in accordance with the formula $P/P° \leq .5$ where P is the pressure of the isomer being adsorbed, and P° is the vapor pressure of the isomers at the temperature of adsorption. Zeolite A, for example, has an adsorption capacity of about 20 weight percent whereas gmelinite, chabazite and levynite have a sorption capacity of approximately 15 weight percent. Aluminosilicates such as zeolite T, offretite and erionite have a sorption capacity of about 6 to 8 weight percent of the isomers. Accordingly, if the period of time allowed for adsorption is such that adsorption of the cis isomer by the aluminosilicate does not exceed 50% of the sorption capacity of the aluminosilicate, and preferably not more than 25%, high concentrates or enrichment ratios of the trans isomer can be obtained. As a general guide, the sorption of the cis isomer to an extent greater than 50 percent of the sorption capacity of the aluminosilicates requires at least about one hour. Consequently time of adsorption is less than about 60 minutes and preferably less than 10 minutes.

It has been also discovered that the ratio of the volume of the trans isomer relative to the volume of the cis isomer adsorbed at the same pressure, referred to as the enrichment ratio, may be unexpectedly and very significantly increased by the preadsorption of water or ammonia in the aluminosilicate in amounts ranging from 1 to 10 ml. per 100 grams of adsorbent.

The following table contains data concerning volume of each isomer adsorbed under the same conditions of vapor and pressure according to Examples 1 through 4.

TABLE 1

| Example No. | 1 | 2 | 3 | 4 |
|---|---|---|---|---|
| Time allowed for adsorption, min. | 1 | 10 | 30 | 60 |
| Enrichment ratio, trans/cis[1] | 7.9 | 3.4 | 2.5 | 2.0 |

[1] Ratio of volumes, at normal liquid density, of adsorbates per 100 gm. dehydrated calcium zeolite A at 26° and 800 mm. Hg.

Approximately 92% of the total adsorption capacity of calcium zeolite A for trans-butene-2 is taken up in the first ten minutes. Only 26% of the total adsorption capacity for cis-butene-2 is taken up in that time. Therefore, by operating at relatively short adsorption times, preferably 10 minutes or less, better separation of the isomers can be realized due to the difference in the relative volumes of cis and trans isomers that are adsorbed. This is attested to by the much higher enrichment ratios obtained when the time allowed for adsorption is short, as in Example 1. The concentration of the two materials in the atmosphere to which the adsorbent is exposed has little to do with the enrichment rate so long as that atmosphere is not so poor in one constituent as to render the operation pointless.

Example 5

The method of Example 1 is repeated except that 1 ml. of water is adsorbed per 100 grams of dehydrated calcium zeolite A prior to contact with the butene feed.

Example 6

The method of Example 1 is repeated except that 5 ml. of water is adsorbed per 100 grams of dehydrated calcium zeolite A prior to contact with the butene feed.

Example 7

The method of Example 1 is repeated except that 10 ml. of water is adsorbed per 100 grams of dehydrated calcium zeolite A prior to contact with the butene feed.

The data resulting from the separation procedures of Examples 5, 6 and 7 conducted over calcium zeolite A containing pre-adsorbed water appear in the following table.

TABLE 2

| Example No. | 5 | 6 | 7 |
|---|---|---|---|
| Time allowed for adsorption, min. | 1 | 1 | 1 |
| Ml. H$_2$O adsorbed per 100 gm. calcium zeolite A | 1 | 5 | 10 |
| Enrichment ratio, trans/cis[1] | 8.4 | 30.0 | 6.0 |

[1] Ratio of volumes, at normal liquid density, of adsorbates per 100 gm. calcium zeolite A at 26° C. and 800 mm. Hg.

The data of Table 2 very strikingly illustrates the tremendous improvement in enrichment ratio that results from pre-adsorption of water onto the calcium zeolite A. In Example 5, the adsorption of 1 ml. of water onto the calcium zeolite A before contact with the butene feed, results in an improvement in the enrichment ratio to 8.4 as compared with 7.9 in Example 1 where no water was pre-adsorbed.

As important as this improvement is, a much greater increase in enrichment ratios is realized when about 5 ml. of water per 100 grams of calcium zeolite A is adsorbed prior to contact, as in Example 6. By proceeding according to Example 6, an enrichment ratio, trans/cis, of 30.0 is obtained which is almost a 400% increase in efficiency over the fully dehydrated adsorbent of Example 1.

It should also be observed that the improvement in enrichment ratio does not continue to increase in direct proportion to the increase in the amount of water which is preadsorbed on the calcium zeolite A. As seen by the results of Example 7, the enrichment ratio decreases to a value of about 6.0 as the amount of pre-adsorbed water is increased to 10 ml. per 100 grams of calcium zeolite A.

Thus, it appears that optimum improvement in the ability of calcium zeolite A to adsorb relatively greater volumes of trans-butene-2 in preference to cis-butene-2 at relatively short adsorption times is realized when the amount of pre-adsorbed water is less than about 10 ml. per 100 grams of the adsorbent. As will be seen from the following examples, Examples 8, 9 and 10, however, the adsorption of larger amounts of water improve the enrichment ratio at longer contact times.

Example 8

The method of Example 3 is repeated except that 1 ml. of water per 100 grams of adsorbent is adsorbed into the calcium zeolite A before contact with the butene feed.

Example 9

The method of Example 3 is repeated except that 5 ml. of water per 100 grams of adsorbent is adsorbed into the calcium zeolite A before contact with the butene feed.

Example 10

The method of Example 3 is repeated except that 10 ml. of water per 100 grams of adsorbent is adsorbed into the calcium zeolite A before contact with the butene feed.

The data derived from Examples 8, 9 and 10 are tabulated in the following table:

TABLE 3

| Example No. | 8 | 9 | 10 |
|---|---|---|---|
| Time allowed for adsorption, min. | 30 | 30 | 30 |
| Ml. H₂O adsorbed per 100 gm. calcium zeolite A | 1 | 5 | 10 |
| Enrichment ratio, trans/cis[1] | 2.6 | 4.2 | 6.4 |

[1] Ratio of volumes at normal liquid density, of adsorbates per 100 gm. calcium zeolite A at 26° C. and 800 mm. Hg.

Attempts to improve the enrichment ratio of calcium zeolite A by the pre-adsorption of compounds other than water have shown that not all materials produce similar improvement even though adsorbed in the same amounts and utilized under the same conditions. By way of illustration, the following examples are based on the pre-adsorption of ammonia.

Example 11

The method of Example 1 is repeated except that 1 ml. of $NH_3$ is adsorbed in the calcium zeolite A before contact with the butene feed.

Example 12

The method of Example 1 is repeated except that 5 ml. of $NH_3$ is adsorbed in the calcium zeolite A before contact with the butene feed.

Example 13

The method of Example 1 is repeated except that 10 ml. of $NH_3$ is adsorbed in the calcium zeolite A before contact with the butene feed.

Example 14

The method of Example 3 is repeated except that 1 ml. of $NH_3$ is adsorbed in the calcium zeolite A before contact with the butene feed.

Example 15

The method of Example 3 is repeated except that 5 ml. of $NH_3$ is adsorbed in the calcium zeolite A before contact with the butene feed.

Example 16

The method of Example 3 is repeated except that 10 ml. of $NH_3$ is adsorbed in the calcium zeolite A before contact with the butene feed.

The results of Examples 11–16 utilizing calcium zeolite A containing pre-adsorbed amounts appear in the following table:

TABLE 4

| Example No. | 11 | 12 | 13 | 14 | 15 | 16 |
|---|---|---|---|---|---|---|
| Time allowed for adsorption, min. | 1 | 1 | 1 | 30 | 30 | 30 |
| Ml. NH₃ adsorbed per 100 gm. calcium zeolite A | 1 | 5 | 10 | 1 | 5 | 10 |
| Enrichment ratio, trans/cis[1] | 6.4 | 3.2 | 1.7 | 2.4 | 1.8 | 1.1 |

[1] Ratio of volumes, at normal liquid density, of adsorbates per 100 gm. dehydrated calcium zeolite A at 26° and 800 mm. Hg.

As will be seen from the above data, a lower enrichment ratio is obtained with 1 ml. of $NH_3$ adsorbed in the calcium zeolite A when the time allowed for adsorption is 1 minute than under the same condition with a fully dehydrated calcium zeolite A. This can be seen by comparing the results of Examples 11 and 1.

Also, by comparing the results of Examples 11, 12 and 13, it is seen that increasing the amount of pre-adsorbed ammonia to 5 ml. and 10 ml. causes a further decrease in the enrichment ratio when still operating at an adsorption time of 1 minute.

The results of Examples 14, 15 and 16 indicate no improvement in enrichment ratio at longer residence times and a decrease in enrichment ratio as the amounts of pre-adsorbed $NH_3$ are raised at longer adsorption times. Thus, pre-adsorbed ammonia produces entirely different results than water in affecting the ability of calcium zeolite A to adsorb transbutene-2 at a relatively more rapid rate than cis-butene-2.

Example 17

Trans and cis isomers of 1,3 pentadiene, hexene-2 and heptene-3 were successively passed through a packed bed of calcium zeolite A at 25° C. Experimental conditions and analytical results are summarized below in Table 5. The data clearly demonstrate that in addition to butenes described previously the method is applicable to other olefins such as n-hexenes and n-heptenes. The data also show that diolefins such as pentadiene can also be enriched or separated by this method.

Example 18

The experiment described in Example 17 was repeated except that natural offretite was used in place of calcium zeolite A. Results are summarized in Table 6.

Example 19

The experiment described in Example 17 was repeated except that a synthetic zeolite T (erionite) was used in place of calcium zeolite A.

Example 20

A mixture of para-xylene and meta-xylene was passed through a packed bed of synthetic sodium mordenite in similar manner as described in previous examples except that the bed was held at 70° C. Results are summarized in Table 8. The data show that although under the experimental conditions both isomers are adsorbed by the zeolite, it is clearly established from the exit gas analysis that para-xylene is preferentially sorbed, resulting in an enrichment of the meta-isomer in the gas stream, and an enrichment of the para-isomer in the adsorbed phase.

|  | Hydrocarbon conc., vol. percent | Hydrocarbon/sorbent ratio, mg./g. | Time allowed for sorption | Gas composition, wt. percent | | | | | | Amount Sorbed mg./g. | | Enrichment ratio |
|---|---|---|---|---|---|---|---|---|---|---|---|---|
|  |  |  |  | Inlet stream | | | Exit stream | | | | | |
|  |  |  |  | t | c | t/c | t | c | t/c | t | c | |
| Table 5 | 4.5 | 11.3 | 1.2 | 71.2 | 20.4 | 3.5 | 18.1 | 50.7 | .36 | 7.6 | 1.1 | 6.9 |
|  | .2 | .62 | 1.2 | 59.3 | 40.7 | 1.5 | 40.0 | 60.0 | .67 | .23 | .05 | 4.6 |
|  | 1.0 | 1.2 | 3.6 | 41.0 | 59.0 | .70 | 15.4 | 84.6 | .18 | .45 | .46 | 1.0 |
| Table 6 | 2.3 | 5.7 | 1.1 | 71.2 | 20.4 | 3.5 | 49.2 | 30.9 | 1.6 | 3.2 | .56 | 5.7 |
|  | 1.9 | 5.6 | 1.1 | 59.3 | 40.7 | 1.5 | 52.9 | 47.1 | 1.1 | 1.8 | .94 | 1.9 |
|  | 1.4 | 4.6 | 1.1 | 41.0 | 59.0 | .7 | 38.7 | 61.3 | .6 | .87 | 1.1 | .8 |
| Table 7 | .9 | 2.3 | 1.8 | 71.2 | 20.4 | 3.5 | 45.3 | 29.2 | 1.6 | 1.3 | .24 | 5.4 |
|  | .8 | 2.3 | 1.8 | 59.3 | 40.7 | 1.5 | 58.1 | 41.9 | 1.4 | .44 | .26 | 1.7 |
|  | .8 | 2.3 | 1.8 | 41.0 | 59.0 | .7 | 32.6 | 67.4 | .5 | .56 | .57 | 1.0 |
|  |  |  |  | Para | Meta | P/m | Para | Meta | P/m | Para | Meta | P/m |
| Table 8 | 2.3 | 2.9 | 3.3 | 42.4 | 57.6 | .74 | 14.6 | 85.4 | .17 | 1.2 | 1.5 | .80 |
|  | 3.8 | 4.8 | 3.3 | 71.3 | 28.7 | 2.5 | 53.2 | 46.8 | 1.1 | 3.2 | 1.2 | 2.7 |

We claim:
1. A method for separating trans olefins from a mixture of trans olefins and cis olefins comprising
    contacting said mixture with erionite for a period of time less than about 60 minutes such that adsorption of the cis isomer does not exceed 50 percent of the sorption capacity of the aluminosilicate for the cis isomer, and
    separating the unadsorbed portion of said mixture from said erionite.

2. The method of claim 1 wherein the cis and trans isomers contain from 4 to 7 carbon atoms per molecule.

3. The method of claim 2 wherein the time period is less than 10 minutes such that adsorption of the cis isomer by the aluminosilicate does not exceed 25 percent of the sorption capacity of the aluminosilicate for the cis isomer.

References Cited

UNITED STATES PATENTS

| | | | |
|---|---|---|---|
| 2,850,549 | 9/1958 | Ray | 260—677 |
| 2,866,835 | 12/1958 | Kimberlin et al. | 260—676 |
| 2,543,286 | 2/1951 | Hirshler | 208—310 |
| 3,070,542 | 12/1962 | Asher et al. | 208—310 |
| 2,987,471 | 6/1961 | Eggertsen | 208—310 |
| 3,106,593 | 10/1963 | Benesi et al. | |
| 3,201,490 | 8/1965 | Lacey et al. | |

HERBERT LEVINE, Primary Examiner

U.S. Cl. X.R.

208—310; 260—674